United States Patent
Usaj et al.

(10) Patent No.: US 11,716,362 B1
(45) Date of Patent: Aug. 1, 2023

(54) METHODS AND APPARATUS TO DE-AUTHENTICATE AND REROUTE CLIENT SESSIONS FOR MEDIA MONITORING

(71) Applicant: The Nielsen Company (US), LLC, New York, NY (US)

(72) Inventors: Marko Usaj, Izola (SI); Marko Panger, Plavje (SL); Andrej Barbis, Ilirska Bistrica (SL)

(73) Assignee: THE NIELSEN COMPANY (US), LLC, New York, NY (US)

( * ) Notice: Subject to any disclaimer, the term of this patent is extended or adjusted under 35 U.S.C. 154(b) by 10 days.

(21) Appl. No.: 17/565,161

(22) Filed: Dec. 29, 2021

(51) Int. Cl.
*H04L 65/613* (2022.01)
*H04L 65/1069* (2022.01)
*H04L 65/612* (2022.01)
*H04L 9/40* (2022.01)

(52) U.S. Cl.
CPC ........ *H04L 65/1069* (2013.01); *H04L 65/612* (2022.05); *H04L 65/613* (2022.05); *H04L 63/06* (2013.01)

(58) Field of Classification Search
CPC .. H04L 65/1069; H04L 65/613; H04W 76/20; H04W 52/0235
See application file for complete search history.

(56) References Cited

U.S. PATENT DOCUMENTS

| | | | | |
|---|---|---|---|---|
| 8,526,346 B1* | 9/2013 | Liu | ............... | H04W 52/0229 370/311 |
| 9,271,136 B2* | 2/2016 | Wentink | ............... | H04W 8/005 |
| 11,102,666 B2 | 8/2021 | Usaj et al. | | |
| 2003/0219008 A1 | 11/2003 | Hrastar | | |
| 2005/0047356 A1* | 3/2005 | Fujii | ............... | G06F 1/3246 370/311 |
| 2009/0034443 A1* | 2/2009 | Walker | ............... | H04W 52/0274 370/311 |
| 2009/0125595 A1 | 5/2009 | Maes | | |
| 2010/0238871 A1 | 9/2010 | Tosic et al. | | |

(Continued)

FOREIGN PATENT DOCUMENTS

| | | |
|---|---|---|
| JP | 2018142929 | 9/2018 |
| WO | 2020190794 | 9/2020 |
| WO | 2020252185 | 12/2020 |

OTHER PUBLICATIONS

International Searching Authority, "International Search Report," dated Jul. 7, 2020 in connection with International Patent Application No. PCT/US2020/022829, 3 pages.

(Continued)

*Primary Examiner* — Oanh Duong
(74) *Attorney, Agent, or Firm* — Hanley, Flight & Zimmerman, LLC

(57) ABSTRACT

Methods, apparatus, systems, and articles of manufacture are disclosed. A non-transitory medium comprises instructions that, when executed, cause at least one processor to at least determine whether client circuitry has entered a power save mode, in response to a determination that the client circuitry has entered the power save mode, generate an association request for an access point, receive a connection approval frame, and in response to a determination that the access point has sent an acknowledge frame, generate an acknowledge response for the access point.

20 Claims, 11 Drawing Sheets

(56) References Cited

U.S. PATENT DOCUMENTS

| | | | |
|---|---|---|---|
| 2013/0156016 A1 | 6/2013 | Debnath et al. | |
| 2015/0049660 A1* | 2/2015 | Kwon | H04W 76/20 |
| | | | 370/311 |
| 2015/0156720 A1* | 6/2015 | Kim | H04W 52/0229 |
| | | | 370/311 |
| 2015/0163742 A1* | 6/2015 | Kwon | H04W 52/0222 |
| | | | 370/311 |
| 2015/0173014 A1* | 6/2015 | Lee | H04W 52/0216 |
| | | | 370/311 |
| 2015/0282053 A1* | 10/2015 | Kneckt | H04W 72/0446 |
| | | | 370/329 |
| 2016/0119872 A1* | 4/2016 | Kim | H04W 72/535 |
| | | | 370/311 |
| 2016/0255586 A1* | 9/2016 | Kwon | H04W 76/20 |
| | | | 370/311 |
| 2016/0323706 A1 | 11/2016 | Splaine et al. | |
| 2017/0372359 A1 | 12/2017 | Bodzo et al. | |
| 2018/0176113 A1 | 6/2018 | Thota | |
| 2018/0359605 A1 | 12/2018 | Splaine et al. | |
| 2019/0149994 A1 | 5/2019 | Van Antwerp et al. | |
| 2019/0313335 A1* | 10/2019 | Kwon | H04W 76/20 |
| 2020/0213936 A1* | 7/2020 | Fan | H04W 88/08 |
| 2020/0221492 A1* | 7/2020 | Lu | H04W 74/004 |
| 2020/0275367 A1* | 8/2020 | Lee | H04W 74/006 |
| 2020/0296608 A1 | 9/2020 | Usaj et al. | |
| 2021/0112493 A1* | 4/2021 | Adusumilli | H04W 8/24 |
| 2021/0160825 A1* | 5/2021 | Li | H04L 5/0053 |
| 2021/0185607 A1* | 6/2021 | Cariou | H04W 52/0216 |
| 2021/0337475 A1* | 10/2021 | Cariou | H04L 5/001 |
| 2021/0385680 A1 | 12/2021 | Usaj et al. | |

OTHER PUBLICATIONS

International Searching Authority, "Written Opinion," dated Jul. 7, 2020 in connection with International Patent Application No. PCT/US2020/022829, 5 pages.

Occupytheweb, "Creating an Evil Twin Wireless Access Point to Eavesdrop on Data," How to Hack Wi-Fi, Jul. 18, 2013, 20 pages.

Kohlios et al., "A Comprehensive Attack Flow Model and Security Analysis for Wi-Fi and WPA3," MDPI: Electronics, Retrieved from https://www.pdpi.com/2079-9292/7/11/284/pdf, Oct. 30, 2018, 28 pages.

United States Patent and Trademark Office, "Non-Final Office Action," issued in connection with U.S. Appl. No. 16/514,996, dated Nov. 10, 2020, 17 pages.

United States Patent and Trademark Office, "Notice of Allowance and Fee(s) Due," issued in connection with U.S. Appl. No. 16/514,996, dated Apr. 20, 2021, 8 pages.

International Searching Authority, "International Preliminary Report on Patentability", issued in connection with International Patent Application No. PCT/US2020/022829 dated Sep. 16, 2021, 6 pages.

European Patent Office, "Extended European Search Report", issued in connection with European Patent Application No. 20773395.7 dated Oct. 13, 2022, 12 pages.

United States Patent and Trademark Office, "Non-Final Office Action," issued in connection with U.S. Appl. No. 17/408,179, dated Nov. 8, 2022, 8 pages.

United States Patent and Trademark Office, "Notice of Allowance and Fee(s) Due," issued in connection with U.S. Appl. No. 17/408,179, dated Feb. 27, 2023, 8 pages.

\* cited by examiner

METHODS AND APPARATUS TO DE-AUTHENTICATE AND REROUTE CLIENT SESSIONS FOR MEDIA MONITORING

FIELD OF THE DISCLOSURE

This disclosure relates generally to media monitoring, and, more particularly, to de-authenticate and reroute client sessions for media monitoring.

BACKGROUND

In recent years, methods of presenting media have evolved. For example, a presentation session may now involve streaming media over a network to a client device. Such presentations may be referred to as streaming sessions. Further, an audience measurement entity (AME) may want to monitor streaming presentations made at the media devices to, among other things, monitor exposure to advertisements, determine advertisement effectiveness, determine user behavior, identify purchasing behavior associated with various demographics, etc. In some examples, an AME may detect streaming sessions through a streaming meter that monitors network traffic to and from a client device.

BRIEF DESCRIPTION OF THE DRAWINGS

FIGS. 3A and 33 are illustrative examples of the connections and interactions between the original access point circuitry, WIFI client circuitry, and alternate access point circuitry of FIG. 1.

Figure 1:
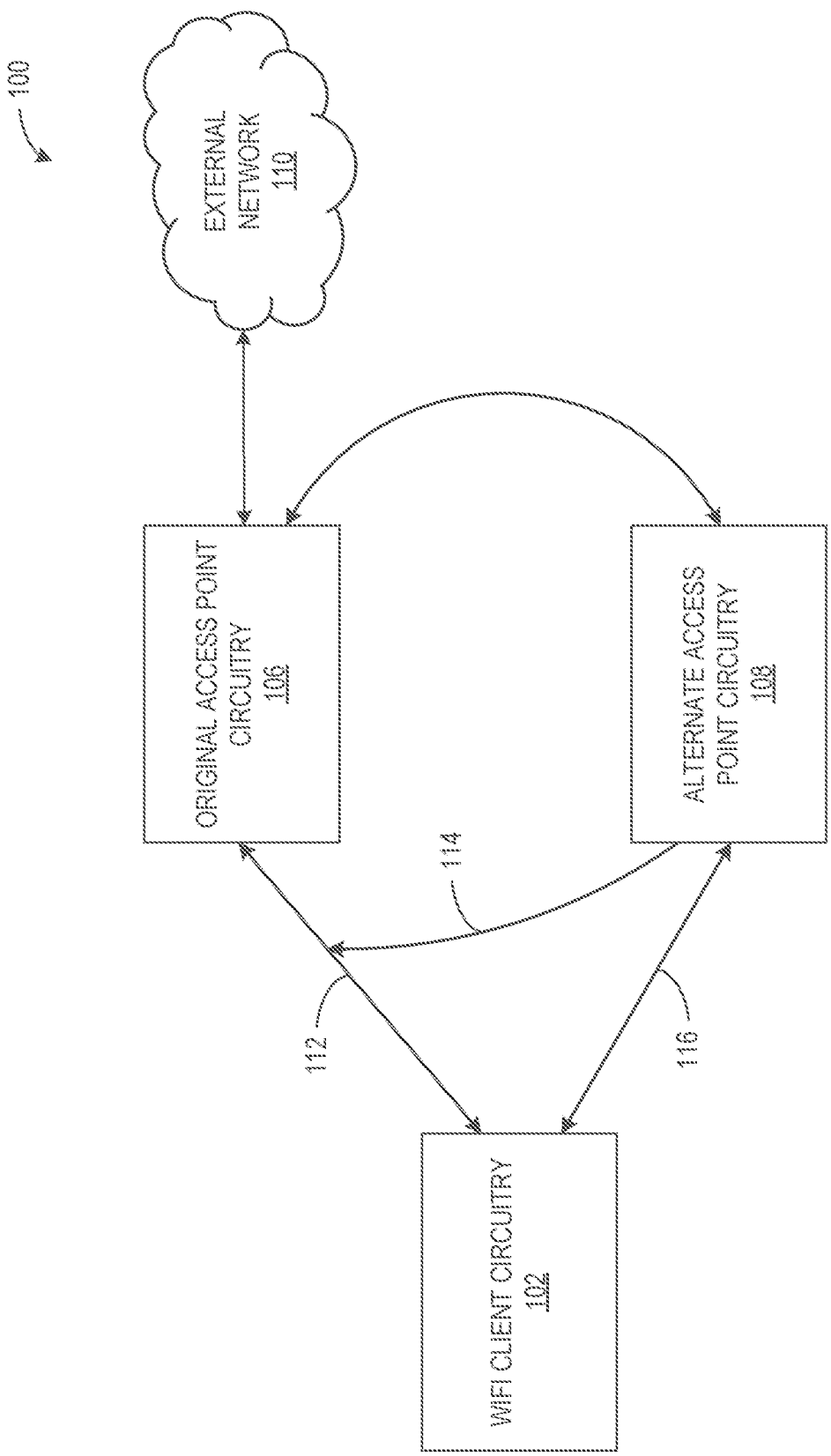
FIG. 1 is a block diagram of an example environment to de-authenticate and reroute client sessions for media monitoring.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

Unless specifically stated otherwise, descriptors such as "first," "second," "third." etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/− 1 second. As used herein, the phrase "in communication." including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g, electrical hardware implemented by one or more transistors). Examples of processor circuitry include programmed microprocessors. Field Programmable Gate Arrays (FPGAs) that may instantiate instructions, Central Processor Units (CPUs). Graphics Processor Units (GPUs). Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

With recent advancements in Internet technology, streaming media has become a major source of media for consumers. To better accommodate for their audiences, media providers, advertising companies, broadcast networks, etc. are often interested in the media habits of their audiences. Media monitors can be installed in consenting households to monitor media consumption in that household. This data can be representative of a larger audience and assist the media providers, advertising companies, broadcast networks, etc. with adapting and improving programming for their audiences. Certain types of media monitors, called streaming meters, allow media streamed over a network (e.g, the Internet, etc.) to be monitored. In some examples, streaming meters monitor home wireless networks (e.g., WIFI networks, etc.) to collect records of media streamed to media devices in the home. In some examples, streaming meters use packet injection and false disassociation/de-authentication to passively monitor WIFI traffic (e.g., by obtaining a WIFI Protected Access 2 (WPA2) session key, etc.)

As used herein, streaming refers to any transmission of data over a network. For example, streaming media refers to the transmission media data (e.g., a video file, an audio file, etc.) over a network such as the internet In some examples, the presentation of the media data at a destination may begin before the entirety of the media data is received by the destination. While examples described herein refer to monitoring streaming media, any type of media that travels via a wireless network such as a WIFI network may be monitored in accordance with this disclosure.

Current streaming meter methods suffer from several problems that make monitoring WIFI traffic difficult. Firstly, WIFI Access Points Protected Management Frames (PMFs) (e.g., as described in Institute of Electrical and Electronics Engineers (IEEE) 802.11w) prevent the streaming meter from forcibly disconnecting a WIFI client circuitry using packet injection, which in turn prevents the streaming meter from decoding the associated WIFI traffic. Secondly, some WIFI security protocols may utilize encryption to prevent a third party device from obtaining session keys from traffic monitoring. Example WIFI security protocols include but are not limited to WPA3. In such examples, future WIFI security protocols may only allow bandwidth usage to be determined by a snooping device and not allow for the collection of details of wireless transactions. Thirdly, environments in which multiple devices connect to WIFI from a shared network, such as multiple input/multiple output (MIMO) configurations and multi-user multiple input/multiple output (MU-MIMO) configurations, increase the importance of the location of the streaming meter when decoding network traffic. In some examples, such configurations make reconstructing multiple signals into useful data difficult.

Examples disclosed herein enable the monitoring of WIFI traffic using alternate access point circuitry installed into a home with the same network credentials (e.g., Service Set Identifier (SSID), password, etc.) as the home's original access point circuitry on a different channel. As used herein, a channel refers to a medium through which an SSID communicates to client devices. For example, in the United States, a 2.4 GHz frequency may have 11 channels and a 5 GHz frequency may have 45 channels.

In some examples disclosed herein, the alternate access point circuitry, referred to as an alternate access point circuitry, includes router circuitry, traffic monitor circuitry, media monitor circuitry, frame generator circuitry and ethernet switch circuitry. In some examples disclosed herein, the router is used for communication with clients and provides conventional access point functionalities. In some examples disclosed herein, the traffic monitor is used to monitor traffic of the household's access point and for packet generation. In some examples disclosed herein, the frame generator can reroute traffic to the alternate access point circuitry using a fake channel change announcement (e.g., imposter channel change announcement, etc.). In such examples disclosed herein, the alternate access point circuitry can capture a frame (e.g., a beacon frame) associated with the original access point circuitry and insert a channel change announcement to instruct the WIFI client circuitry to switch to the channel associated with the alternate access point circuitry.

FIG. 1 is a block diagram of an example environment 100 in which the teachings of this disclosure may be implemented. In the illustrated example, the example environment 100 includes example WIFI client circuitry 102, example original access point circuitry 106, example alternate access point circuitry 108, and an example external network 110. In the illustrated example, the example environment 100 is a home of a consumer. In other examples, the example environment 100 may be any area in which streaming media is viewed (e.g., public transit, a business, etc.).

The example WIFI client circuitry 102 is a device that retrieves media from the external network 110 for presentation. In some examples, the WIFI client circuitry 102 is capable of directly presenting media (e.g., via a display). In other examples, the WIFI client circuitry 102 can present the media on separate media presentation equipment (e.g., speakers, an external display, etc.). Thus, the WIFI client circuitry 102 may or may not be able to present media without assistance from a second device In some examples, the WIFI client circuitry 102 may be an Internet-enabled mobile device (e.g., a smartphone, a portable music player, a portable video player, etc.), video game consoles, tablet computers, digital media players (e.g., digital video recorder, over-the-top devices, etc.), smart televisions, desktop computers, laptop computers, servers, etc. In the example environment 100, the WIFI client circuitry 102 is operated by a panelist. As used herein, a panelist refers to anyone who agrees to share their streaming media information to an example AME.

The example original access point circuitry 106 is a networking device that facilities connection between WIFI client circuitry 102 and the external network 110. In some examples, the original access point circuitry 106 is a hardware device provided by an internet provider of the example environment 100. In some examples, the original access point circuitry 106 can be connected to a router. In other examples, the original access point circuitry 106 can be integrated into a router. In the illustrated example, the original access point circuitry 106 communicates with the WIFI client circuitry 102 using management frames (e.g., beacon frames, etc.). In some examples, the WIFI client circuitry 102 and the original access point circuitry 106 exchange first communications 112 which can include the management frames, media requests, etc.

The example alternate access point circuitry 108 is networking device that facilitates a connection between the WIFI client circuitry 102 and the external network 110. In the illustrated example, the example alternate access point circuitry 108 has the same network credentials (e.g., the same SSID and password, etc.) as the original access point circuitry 106. In some examples, the example alternate access point circuitry 108 has a different channel than the original access point circuitry 106. In some examples, the original access point circuitry 106 is a hardware device provided by a monitoring agency (e.g., a monitoring element of a media provider, an independent monitoring entity, etc.) In some examples, the example alternate access point circuitry 108 monitors the traffic of the original access point circuitry 106 (e.g., via the second communications 114, etc.). In some examples, the example alternate access point circuitry 108 can intercept a management frame sent by the original access point circuitry 106 to the WIFI client circuitry 102. In such examples, the original access point circuitry 106 can insert a channel change request into the management frame. In some examples, the channel change request can conform to the standard set forth in IEEE 802.11h. In such examples, the channel change request is a broadcast packet and cannot be protected by IEEE 802.11w.

In some examples, the channel change request can instruct the WIFI client circuitry 102 to connect to the example alternate access point circuitry 108. In some examples, once the WIFI client circuitry 102 is connected to the example alternate access point circuitry 108 (e.g., via the third communications 116), the example alternate access point circuitry 108 can directly connect to the external network 110 (not depicted.) In other examples, the example alternate access point circuitry 108 can connect the WIFI client circuitry 102 to the external network 110 via any other suitable means. In some examples, when presented with two access points with the same SSID, the WIFI client circuitry 102 will connect to the access point with the strongest signal In such examples, the example alternate access point circuitry 108 can be configured to have a stronger signal than the original access point circuitry 106. In some examples, when the WIFI client circuitry 102 is connected to the example alternate access point circuitry 108, the WIFI client circuitry 102 can transmit the example third communications 116. In such examples, the example third communications 116 can include the media requests. In some examples, the example alternate access point circuitry 108 can create records of media transmitted to the WIFI client circuitry via the example alternate access point circuitry 108. In some examples, if the example alternate access point circuitry 108 fails (e.g., a power failure, etc.), the WIFI client circuitry 102 will automatically reconnect to the original access point circuitry 106 (e.g., by reassuming the communications 112). In some examples, the example alternate access point circuitry 108 can also be physically connected to one or more media devices (e.g., via an ethernet connection, etc.). In such examples, the example alternate access point circuitry 108 can also monitor traffic transmitted via the physical connection.

The external network 110 of FIG. 1 connects and facilitates communication between the original access point circuitry 106 and/or the example alternate access point circuitry 108 to a web-location that contains media (e.g. a server associated with a streaming service, etc.) and/or to an example AME. In this example, the external network 110 is the Internet. However, the example external network 110 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

In the example environment 100, the WIFI client circuitry 102 and the original access point circuitry 106 exchange first communications 112, which include media requests transmitted by the WIFI client circuitry 102. The example alternate access point circuitry 108 then transmits second communications 114 which causes the original access point circuitry 106 to disconnect from the WIFI client circuitry 102. Next, the example alternate access point circuitry 108 and the example WIFI client circuitry 102 exchange third communications 116 include media requests transmitted by the WIFI client circuitry 102. By assuming the task of providing media data to the WIFI client circuitry 102, the example alternate access point circuitry 108 is also able to provide information about the media to the example AME via the external network 110. The example AME may then use the media information for use in ratings development and/or other analyses.

Figure 2:
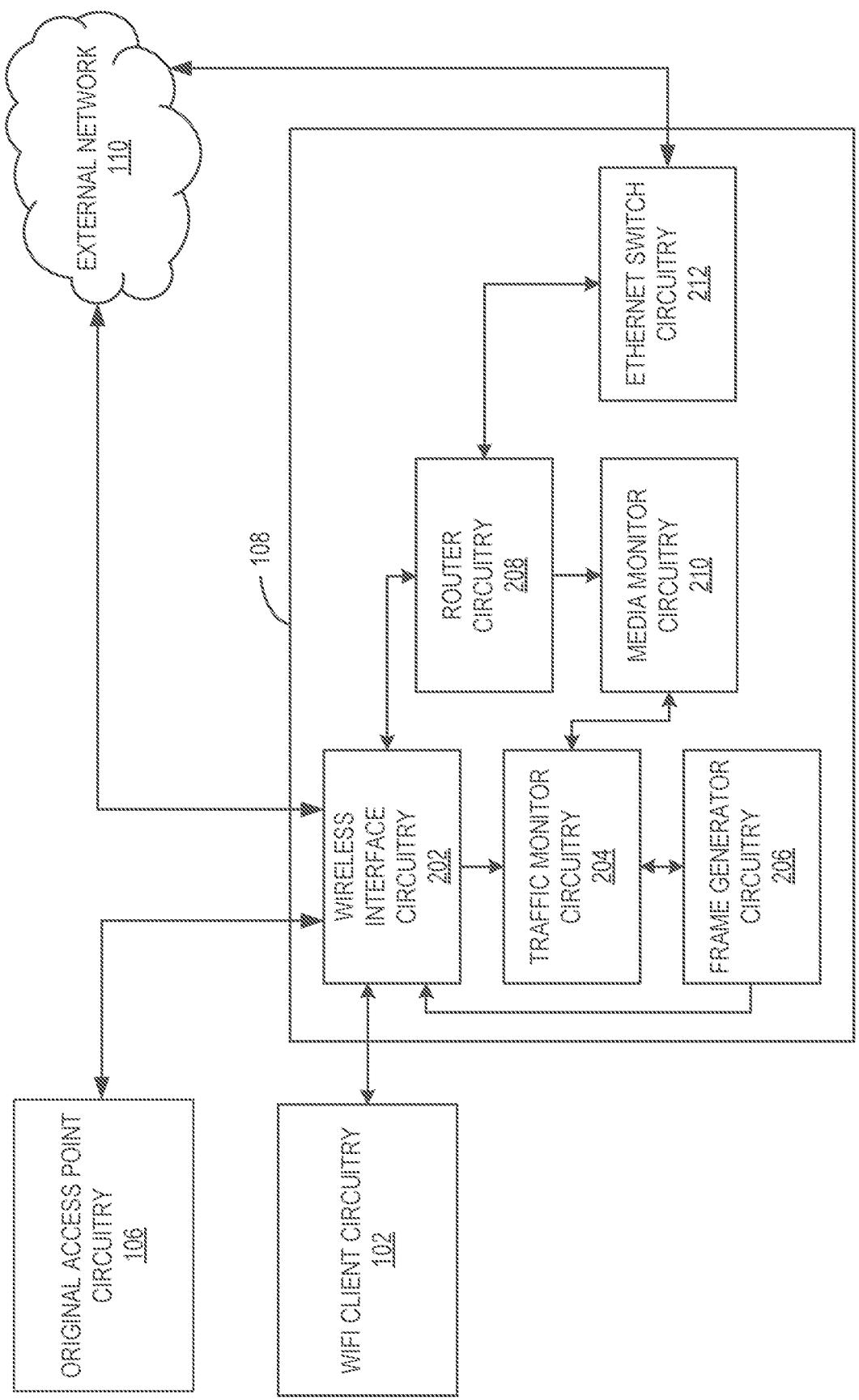
FIG. 2 is block diagram of an example implementation of the alternate access point circuitry, of FIG. 1.

FIG. 2 is a block diagram an example implementation of the example alternate access point circuitry 108 of FIG. 1. The example alternate access point circuitry 108 includes an example wireless interface circuitry 202, an example traffic monitor circuitry 204, an example frame generator circuitry 206, an example router circuitry 208, an example media monitor circuitry 210 and an example ethernet switch circuitry 212.

The example wireless interface circuitry 202 receives wireless transmissions transmitted within its detection range and transmits wireless signals from the example alternate access point circuitry 108 to the WIFI client circuitry 102. For example, the example wireless interface circuitry 202 can receive transmissions from the WIFI client circuitry 102 and/or the external network 100. In some examples, the wireless interface circuitry 202 can configure the network credentials (e.g., the SSID, the password, etc.) of the example alternate access point circuitry 108. For examples, the wireless interface circuitry 202 can receive instructions to change the SSID and password of the example alternate access point circuitry 108 to that of the original access point circuitry 106.

In other examples, the wireless interface circuitry 202 can configure any other suitable characteristics of the example alternate access point circuitry 108. In some examples, the wireless interface circuitry 202 can be implemented using multiple interfaces. In such examples, a first one or more wireless interfaces may monitor traffic and/or packet injection. In such examples, a second one or more wireless interfaces may facilitate standard communication with the WIFI clients (e.g., the WIFI client circuitry 102, etc.). In some examples, standard communication may refer to receiving requests from the WIFI-clients for certain data, transmitting the requests over the external network 110, and transmitting the returning data to the appropriate WIFI-client. In some such examples, the first one or more wireless interfaces may not include any of the second one or more wireless interfaces. In other examples, one or more wireless interfaces may be shared by the first one or more wireless interfaces and the second one or more wireless interfaces.

The example traffic monitor circuitry 204 monitors the traffic of the original access point circuitry 106. In some examples, the example traffic monitor circuitry 204 can additionally craft the packets used to interact with the WIFI client circuitry 102. In some examples, the example traffic monitor circuitry 204 can detect and intercept the management frames transmitted by the original access point circuitry 106. In some examples, the example traffic monitor circuitry 204 can query the router circuitry 208 to determine the network addresses of packets transmitted and/or intercepted via the example alternate access point circuitry 108. For example, the example traffic monitor circuitry 204 can identify identifiers (e.g., a MAC address, an SSID, etc.) identified in the communications between the WIFI client circuitry 102 and the original access point circuitry 106 that indicate the identity of the WIFI client circuitry 102 and the original access point circuitry 106. In some examples, the example traffic monitor circuitry 204 can analysis traffic transmitted via the example alternate access point circuitry 108. In such examples, the example traffic monitor circuitry 204 can identify traffic related to media requests from streaming services. In some examples, the example traffic monitor circuitry 204 can also monitor traffic transmitted over one or more physical connections.

The example frame generator circuitry 206 generates and/or modifies frames to be transmitted by the router circuitry. 208 via the wireless interface circuitry 202. For example, the example frame generator circuitry 206 can generate management, control and/or data frames to be used to modify the connection between the WIFI client circuitry 102, the original access point circuitry 106 and/or the example alternate access point circuitry 108. For example, the example frame generator circuitry 206 can modify a captured beacon frame to include a channel change request. In some examples, the example frame generator circuitry 206 identifies the section of the management frame associated with transmission channel. In such examples, the example frame generator circuitry 206 inserts, modifies and/or otherwise changes the channel associated with the captured modified frame. In such examples, the example frame generator circuitry 206 can cause the captured beacon frame to include instructions for the WIFI client circuitry 102 to connect to the channel associated with the example alternate access point circuitry 108.

The example router circuitry 208 is used for communications with WIFI clients (e.g., the WIFI client circuitry 102) and to allow the example alternate access point circuitry 108 with conventional access point functionalities. For example, the router circuitry 208 can direct data packets received via the wireless interface circuitry 202 and/or external network 110 to their intended destinations. In such examples, the router circuitry 208 can detect a network address embedded in the packet to determine the destination of the packet. In some examples, the example traffic monitor circuitry 204 and/or the media monitor circuitry 210 can interface with the router circuitry 208 to receive the network address In some examples, the router circuitry 208 can include any number of individual routers configured to specific WIFI transmission bands (e.g., 2.4 GHz, 5 GHz, etc.).

The example media monitor circuitry 210 analyzes media requests transmitted via the example alternate access point circuitry 108. For example, the media monitor circuitry 210 can extract information from a media request (e.g., a request to stream media from a streaming service, etc.) that includes media identifying information In some examples, the media monitor circuitry 210 extracts a watermark and/or generates a fingerprint based on the transmitted media request. In some examples, the media monitor circuitry 210 correlates the destination of the media request (e.g., a particular streaming service, etc.) and the media request to identify the media associated with the media request (e.g., via a look-up table, etc.). In some examples, the media identifying information can include user identifying information. In some examples, the media monitor circuitry 210 can transmit the extracted media identifying information to a central facility of an AME. In such examples, the media monitor circuitry 210 can transmit the media identifying information periodically or continuously. In other examples, the media monitor circuitry 210 may store the media identifying information on a memory associated with the example alternate access point circuitry 108. In some such examples, a technician associated with the AME may manually retrieve the media identifying information from the example alternate access point circuitry 108.

The example ethernet switch circuitry 212 enables ethernet connections into the alternate access point circuitry 108. For example, the ethernet switch circuitry 212 allows the example alternate access point circuitry 108 to be physically connected with a media device (e.g., a personal computer, etc.) over a wired connection. In such examples, the ethernet switch circuitry 212 allows the example alternate access point circuitry 108 to monitor media transmitted to physically connected devices (e.g., over an ethernet cable, etc.) over a wired connection. In some examples, the ethernet switch circuitry 212 can be coupled to the original access point circuitry 106 (e.g., as illustrated in FIG. 1, etc.). In other examples, the ethernet switch circuitry 212 can be coupled to any suitable external connection such as but not limited to the external network 110. In some examples, the ethernet switch circuitry 212 can be absent. In such examples, the example alternate access point circuitry 108 can communicate with the external network 110 via wireless communication.

In some examples, the example alternate access point circuitry 108 includes means for receiving and transmitting wireless transmissions. For example, the means for receiving and transmitting may be implemented by wireless interface circuitry 202. In some examples, the wireless interface circuitry 202 may be implemented by machine executable instructions such as that implemented by at least blocks 402, 404, 401, 414-418 of FIG. 4 executed by processor circuitry, which may be implemented by the example processor circuitry 712 of FIG. 7, the example processor circuitry 80) of FIG. 8, and/or the example Field Programmable Gate Array (FPGA) circuitry 900 of FIG. 9. In other examples, the wireless interface circuitry 202 is implemented by other hardware logic circuitry, hardware implemented state machines, and/or any other combination of hardware, software, and/or firmware. For example, the wireless interface circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example alternate access point circuitry 108 includes means for monitoring network traffic and means for detecting packets in network traffic. For example, the means for monitoring and means for detecting may be implemented by example traffic monitor circuitry 204. In some examples, the example traffic monitor circuitry 204 may be implemented by machine executable instructions such as that implemented by at least blocks 402, 404, 410, and 412 executed by processor circuitry, which mas be implemented by the example processor circuitry 712 of FIG. 7, the example processor circuitry 800 of FIG. 8, and/or the example Field Programmable Gate Array (FPGA) circuitry 900 of FIG. 9. In other examples, the example traffic monitor circuitry 204 is implemented by other hardware logic circuitry, hardware implemented state machines, and/or any other combination of hardware, software, and/or firmware. For example, the example traffic monitor circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example alternate access point circuitry 108 includes means for generating and/or modifying a frame of data. For example, the means for generating may be implemented by example frame generator circuitry 206. In some examples, the example frame generator circuitry 206 may be implemented by machine executable instructions such as that implemented by at least blocks 408, 414, 416, and 418 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the example frame generator circuitry 206 is implemented by other hardware logic circuitry, hardware implemented state machines, and/or any other combination of hardware, software, and/or firmware. For example, the example frame generator circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example alternate access point circuitry 108 includes means for directing packets to a destination. For example, the means for directing may be implemented by router circuitry 208. In some examples, the router circuitry 208 may be implemented by machine executable instructions such as that implemented by at least blocks 408, 414, 416, and 418 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the router circuitry 208 is implemented by other hardware logic circuitry, hardware implemented state machines, and/or any other combination of hardware, software, and/or firmware. For example, the router circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example alternate access point circuitry 108 includes means for extracting media identifying information. For example, the means for extracting may be implemented by media monitor circuitry 210. In some examples, the media monitor circuitry 210 may be implemented by machine executable instructions such as that implemented by at least blocks 418, 608 of FIGS. 4, 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the media monitor circuitry 210 is implemented by other hardware logic circuitry, hardware implemented state machines, and/or any other combination of hardware, software, and/or firmware. For example, the media monitor circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example alternate access point circuitry 108 includes means for enabling physical connections. For example, the means for enabling may be implemented by ethernet switch circuitry 212. In some examples, the ethernet switch circuitry 212 may be implemented by machine executable instructions such as that implemented by at least blocks 402, 404, 408, 414-418 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the ethernet switch circuitry 212 is implemented by other hardware logic circuitry, hardware implemented state machines, and/or any other combination of hardware, software, and/or firmware. For example, the ethernet switch circuitry 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example alternate access point circuitry 108 of FIG. 2 blocks the first communications 112 between the WIFI client circuitry 102 and the original access point circuitry 106 so that it can establish third communications 116 with the WIFI client circuitry 102 and monitor media requests. As used herein, reference to the example alternate access point circuitry 108 sending a frame, responding with a frame, or any derivation of thereof refers to the example frame generator circuitry 206 generating or modifying a frame of data, and the example router circuitry 208 directing the frame to its destination Nia the example wireless interface circuitry 202 and/or the ethernet switch circuitry 212. Similarly, as used herein, reference to the alternate access point circuitry monitoring, detecting, or identifying data refers to the example traffic monitor circuitry 204 monitoring network traffic sent to and from the original access point circuitry 106 via the example wireless interface circuitry 202 and/or the ethernet switch circuitry 212.

Figure 3A:
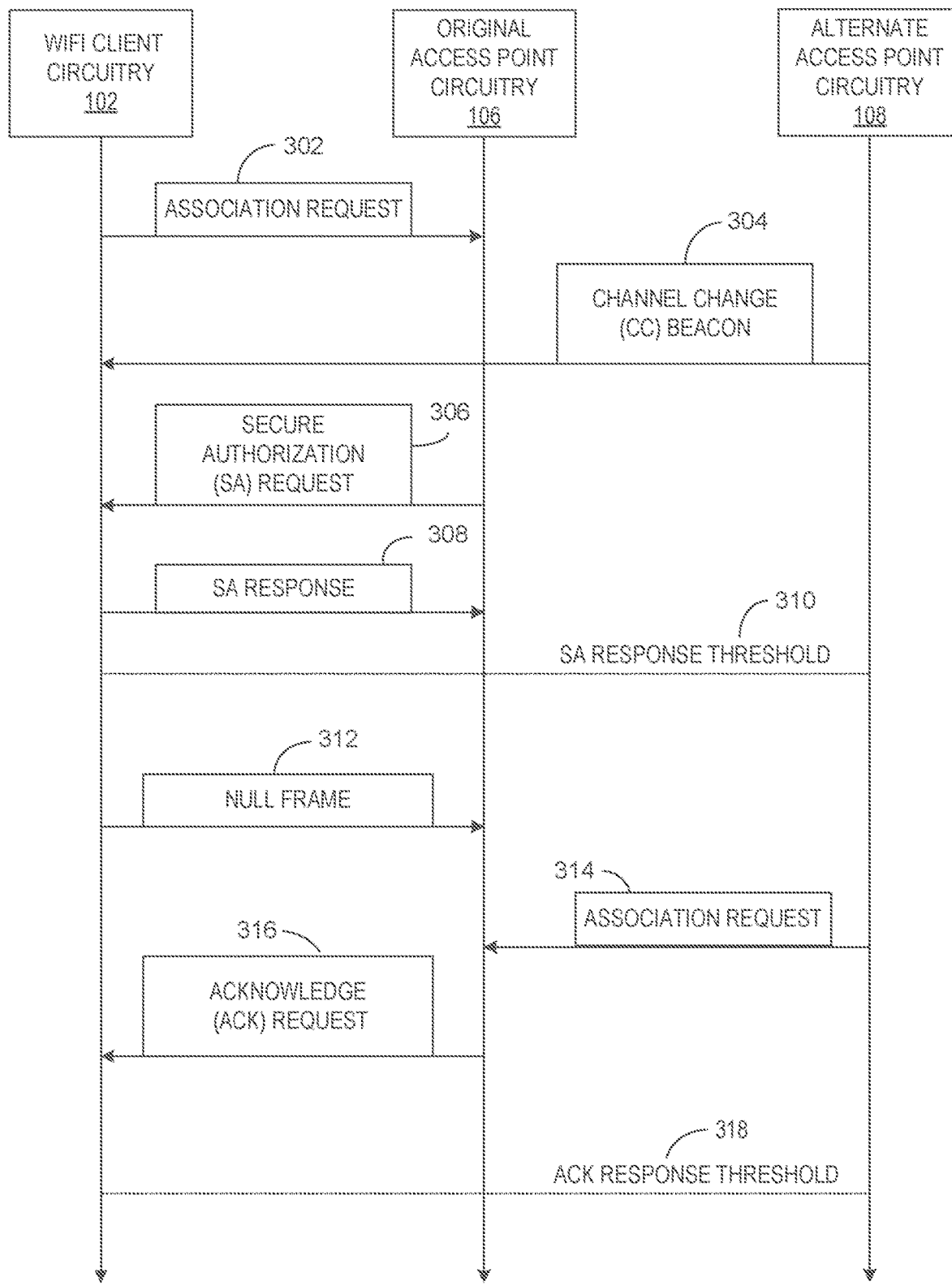
Figure 3B:
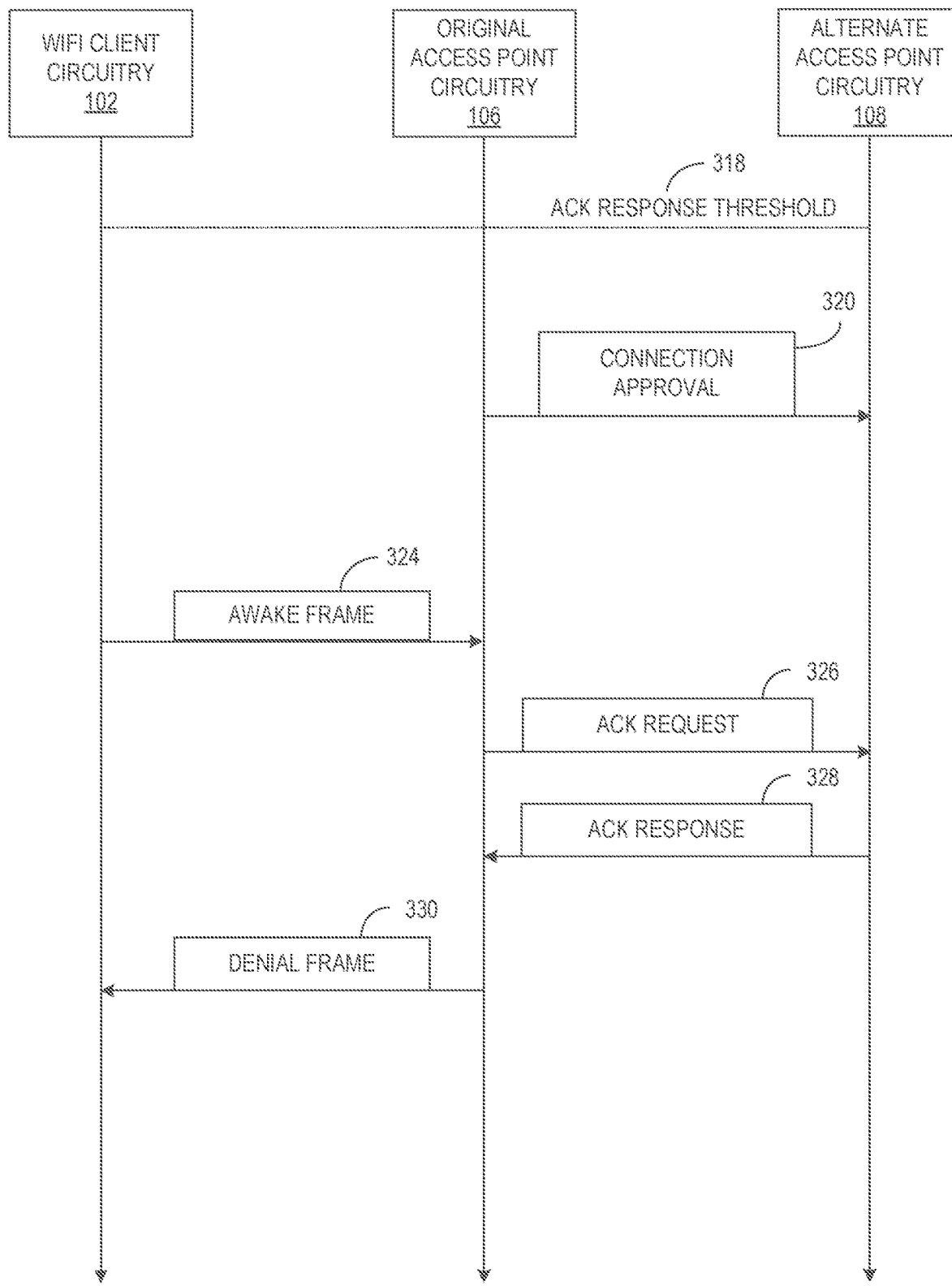

FIGS. 3A and 3B are an illustrative example of the connections and interactions between the WIFI client circuitry 102, original access point circuitry 106, and example alternate access point circuitry 108. FIGS. 3A and 3B shows vertical lines from each device to show when a particular device sends or receives a communication in time. The spacing between messages is not intended to represent units of time. Rather, the order of messages represent whether a first illustrated communication is sent before or after a second illustrated communication In general, communications illustrated closer to the WIFI client circuitry 102, original access point circuitry 106, and example alternate access point circuitry 108 blocks are sent earlier in time than communications illustrated further away from the blocks. Furthermore, in some examples, the example environment 100 may only include a subset of the communications illustrated in FIGS. 3A and 3B. In other examples, the example environment 100 may include additional communications not illustrated in FIGS. 3A and 3B.

The illustrative example begins in FIG. 3A when the WIFI client circuitry 102 sends an association request 302 to the original access point circuitry 106. The WIFI client circuitry 102 sends the association request 302 so that it can connect with the original access point circuitry 106 and send the original access point circuitry 106 requests for streaming media data. The association request 302 contains information including but not limited to the Media Access Control (MAC) address of the WIFI client circuitry 102. In first communications 112 described previously, the original access point circuitry 106 uses the MAC address to provide data to the WIFI client circuitry 102 that was received following transmission of a streaming media data request.

The example traffic monitor circuitry 204 detects the arrival of the association request 302 by monitoring the traffic of the original access point circuitry 106. The example alternate access point circuitry 108 uses the association request 302 to store the MAC address of the WIFI client circuitry 102. The example frame generator circuitry 206 also generates a channel change beacon frame 304, which is sent to the WIFI client circuitry via the wireless interface circuitry 202. The channel change beacon frame 304 requests that the WIFI client circuitry 102 change channels and make a new connection with the example alternate access point circuitry 108.

Upon receipt of the association request 302, the original access point circuitry 106 may send a Secure Authorization (SA) request 306 to the WIFI client circuitry 102. The original access point circuitry 106 may send the SA request 306 to confirm that the WIFI client circuitry 102 is prepared and/or authorized for communication. If the WIFI client circuitry 102 responds to the SA request, and the SA response is received by the original access point circuitry 106 within a given amount of time, then connection has been established between the WIFI client circuitry 102 and original access point circuitry 106 is successfully established and transmission of streaming media data may begin or resume. In such examples, the WIFI client circuitry 102 has ignored the channel change beacon frame 304 in favor of sending the SA response 308. The given amount of time for the SA response is illustrated in FIG. 3A as the space between the SA request 306 and the SA response threshold 310. However, if the WIFI client circuitry 102 doesn't respond to the SA request 306, or the original access point circuitry 106 does not receive the response before the SA response threshold 310, the original access point circuitry 106 treats the connection with the WIFI client circuitry 102 as broken.

By sending the channel change beacon frame 304 to the WIFI client circuitry 102, the example alternate access point circuitry 108 attempts to establish a new connection with the WIFI client circuitry 102 before the WIFI client circuitry 102 can successfully connect with the original access point circuitry 106. If such a new connection is made, the example alternate access point circuitry 108 may block the original connection between the WIFI client circuitry 102 and the original access point circuitry 106. Such connection blocking is taught by Usaj, U.S. Pat. No. 11,102,666, herein after Usaj, which is hereby incorporated by reference in its entirety.

In some examples, the WIFI client circuitry 102 does not meet the SA response threshold 310 and the example alternate access point circuitry 108 blocks the original connection to the original access point circuitry 106 as described by Usaj. In the illustrated example of FIG. 3A, however, the WIFI client circuitry 102 does send a SA response 308 to the original access point circuitry 106 before the SA response threshold 310. In such examples, the example traffic monitor circuitry 204 monitors network traffic until it is able to determine that the WIFI client circuitry 102 has entered into a power save mode.

In some example communication protocols, the WIFI client circuitry 102 may enter a power save mode during periods of inactivity. In power save mode, the WIFI client circuitry 102 is restricted from sending or receiving data as a technique to save energy. To initiate power save mode, the WIFI client circuitry 102 may send a null frame 312 to the original access point circuitry 106. In some examples, the WIFI client circuitry 102 may send a data frame with a power save flag or bit enabled rather than the null frame 312 to initiate the power save mode. In some examples, the example alternate access point circuitry 108 waits for the WIFI client circuitry to self-initiate a power save mode. In other examples, the alternate access point circuitry triggers the WIFI client circuitry 102 to enter the power save mode.

When the example traffic monitor circuitry 204 determines that the null frame 312 or similar notice of power save mode has been sent, the example frame generator circuitry 206 generates an association request 314 that is sent to the original access point circuitry 106 via the wireless interface circuitry 202 or example ethernet switch circuitry 212. The association request 314 includes the MAC address of the WIFI client address obtained during the previous association request 302. The association request 314 may also request access to data frames that were originally intended for the WIFI client circuitry 102 but have been held in a buffer by the original access point circuitry 106 since the power save mode was initiated.

Because the association request 314 includes the MAC address of the example WIFI client circuitry 102, the original access point circuitry 106 may be unsure which of the WIFI client circuitry 102 and the alternate access point circuitry 108 is actually the device that participated in first communications 112. Therefore, the original access point circuitry 106 may send an acknowledge frame 316 to the WIFI client circuitry 102, as it first provided the MAC address in the previous association request 302. In some examples, the original access point circuitry 106 may send a second SA request rather than an acknowledge frame 316.

The example original access point circuitry 106 may wait a given amount of time for the WIFI client circuitry 102 to respond to the acknowledge frame 316. The time the example original access point circuitry 106 waits for a response is illustrated in FIGS. 3A and 3B as the acknowledge response threshold 318. In examples where the original access point circuitry 106 sends a second SA request rather than an acknowledge frame 316, the acknowledge response threshold 318 may be referred to as a second SA response threshold.

The illustrative example of FIG. 3A continues in FIG. 3B. The acknowledge response threshold 318 is shown in both FIGS. 3A and 3B to illustrate how the figures relate to one another in time. Because the WIFI client circuitry 102 is in power save mode when the acknowledge frame 316 is sent, the WIFI client circuitry 102 is unable to respond unless it exits power save mode. In the illustrated example of FIGS. 3A and 3B, the WIFI client circuitry 102 does not exit power save mode and a response to the association request 314 is not sent.

Once the acknowledge response threshold 318 passes without a response, the original access point circuitry 106 may assume that the alternate access point circuitry 108 is the true owner of the MAC address and had previously participated in the first communications 112. In some examples, the original access point circuitry 106 sends a connection approval frame 320 to establish connections with the example alternate access point circuitry 108. The connection approval frame 320 may include session keys to encrypt the second communications 114. The connection approval frame 320 may additionally or alternatively include other parameters for use in the second communications 114. By establishing a new connection with the example alternate access point circuitry 108, the original access point circuitry 106 considers the original connection to the WIFI client circuitry 102 broken.

The WIFI client circuitry 102 exits the power save mode by sending an awake frame 324 to the original access point circuitry 106. In some examples, the awake frame 324 is a null frame. In other examples, the awake frame 324 is a data frame with a power save flag or bit disabled. In response to the awake frame, the original access point circuitry 106 may send an acknowledge frame 326 to the alternate access point circuitry 108 to verify that the new connection established during power save is still valid. In such examples, the alternate access point circuitry 108 sends an acknowledge response 328 to the original access point circuitry 106.

When the alternate access point circuitry 108 sends the acknowledge response 328, the original access point circuitry 106 may consider the original connection to the WIFI client circuitry 102 to be broken. In some examples, the original access point circuitry 106 therefore sends a denial frame 330 to the WIFI client circuitry 102 indicating the request for connection has been denied In some examples, does not respond to the awake frame 324.

After successfully establishing second communications 114 with the original access point circuitry 106, the alternate access point circuitry 108 establishes third communications 116 with the WIFI client circuitry. In some examples, third communications 116 are established when the WIFI client circuitry 102 sends an association request to the example alternate access point circuitry 108 so that it can reconnect to an access point and access media from the external network 110. In other examples, the alternate access point circuitry 108 sends another channel change beacon frame to the WIFI client circuitry 102 to establish the third communications 116.

FIGS. 3A and 3B illustrate how the example alternate access point circuitry 108 may establish a connection with the WIFI client circuitry 102. In examples where the WIFI client circuitry 102 does not respond to the channel change beacon frame 304, the example alternate access point circuitry 108 waits for the WIFI client circuitry 102 enters a power save mode. The example alternate access point circuitry 108 is then able to connect to the original access point circuitry 106, effectively blocking the connection between the original access point circuitry 106 and the WIFI client circuitry 102, without the WIFI client circuitry 102 being awake to stop the new connection. This results in the WIFI client circuitry 102 establishing third communications 116 with the example alternate access point circuitry 108. After the third communications 116 are established, the example alternate access point circuitry 108 accepts requests for streaming media data from the WIFI client circuitry 102 and passes information describing the streaming media requests to the example AME.

Figure 4:
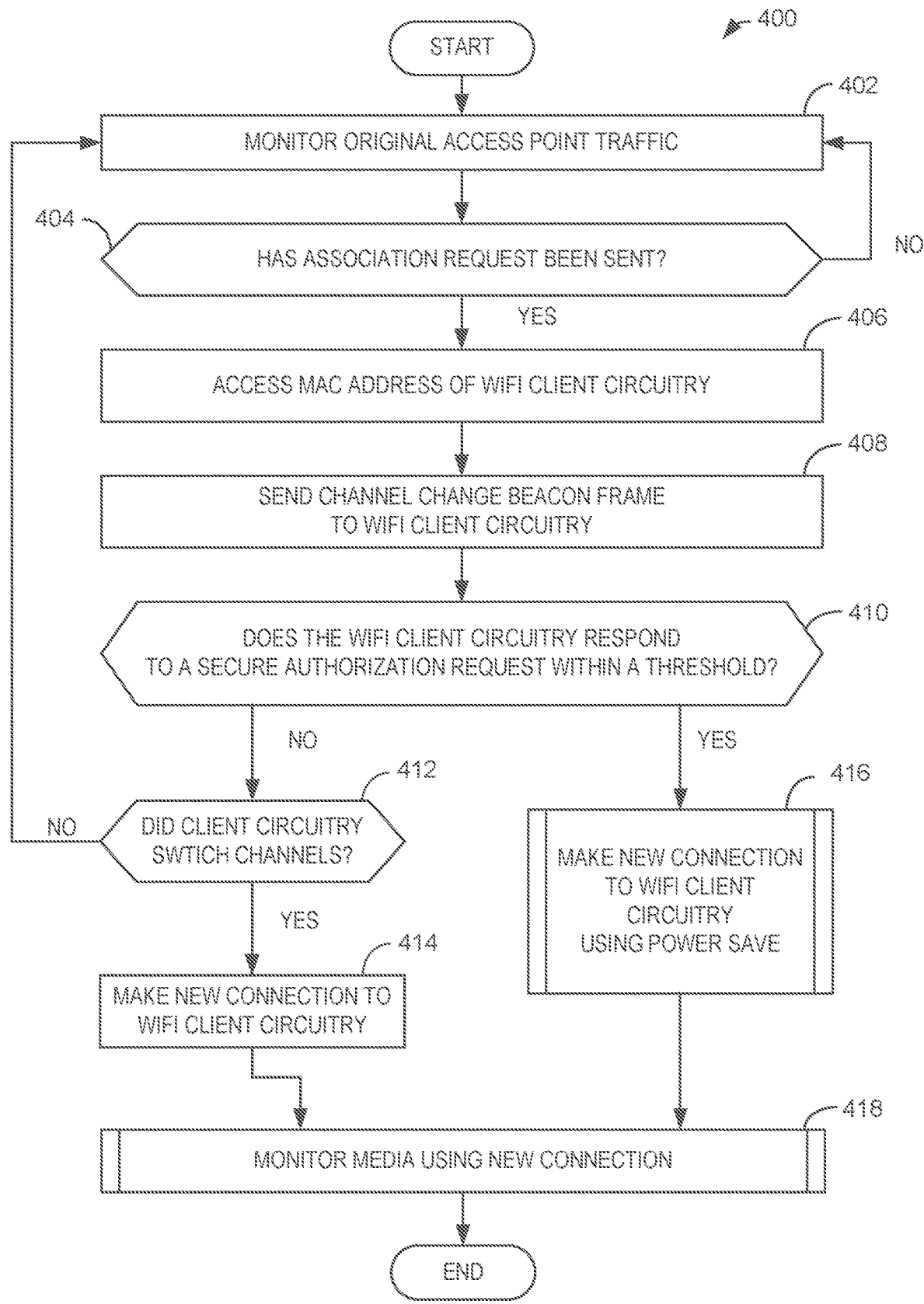
FIG. 4 is a flowchart representative of example machine readable instructions that may be executed by example processor circuitry to implement the alternate access point circuitry of FIG. 1.

While an example manner of implementing the example alternate access point circuitry 108 of FIG. 2 is illustrated in FIG. 4, one or more of the elements, processes, and/or devices illustrated in FIG. 4 may be combined, divided, re-arranged, omitted, eliminated, and/or implemented in any other way. Further, the example wireless interface circuitry 202, the example traffic monitor circuitry 204, the example frame generator circuitry 206, the example router circuitry 208, the example media monitor circuitry 210, the example ethernet switch circuitry 212 and/or, more generally, the example alternate access point 108 of FIG. 2, may be implemented by hardware, software, firmware, and/or any combination of hardware, software, and/or firmware. Thus, for example, any of the example wireless interface circuitry 202, the example traffic monitor circuitry 204, the example frame generator circuitry 206, the example router circuitry 208, the example media monitor circuitry 210, the example ethernet switch circuitry 212 and/or, more generally, the example alternate access point 108 of FIG. 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example wireless interface circuitry 202, the example traffic monitor circuitry 204, the example frame generator circuitry 206, the example router circuitry 208, the example media monitor circuitry 210, the example ethernet switch circuitry 212 and/or, more generally, the example alternate access point 108 of FIG. 2 is/are hereby expressly defined to include a non-transitory computer readable storage device or storage disk such as a memory, a digital versatile disk (DVD), a compact disk (CD), a Blu-ray disk, etc, including the software and/or firmware. Further still, the example alternate access point circuitry 108 of FIG. 2 may include one or more elements, processes, and/or devices in addition to, or instead of, those illustrated in FIG. 4, and/or may include more than one of any or all of the illustrated elements, processes and devices.

Figure 5:
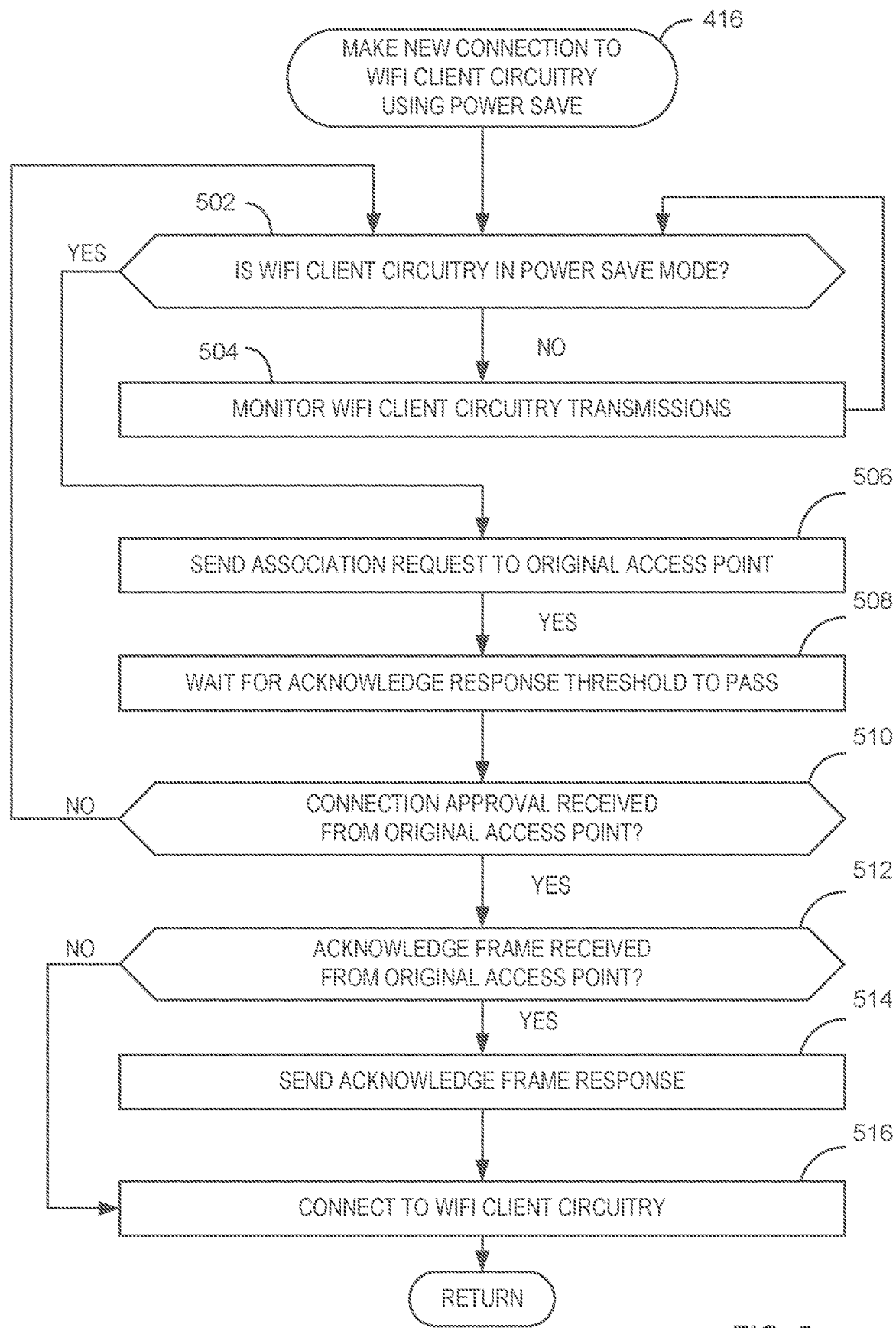
FIG. 5 is a flowchart representative of example machine readable instructions that may be executed to make a newt connection to WIFI client circuitry using a power save mode as described in FIG. 4.
Figure 6:
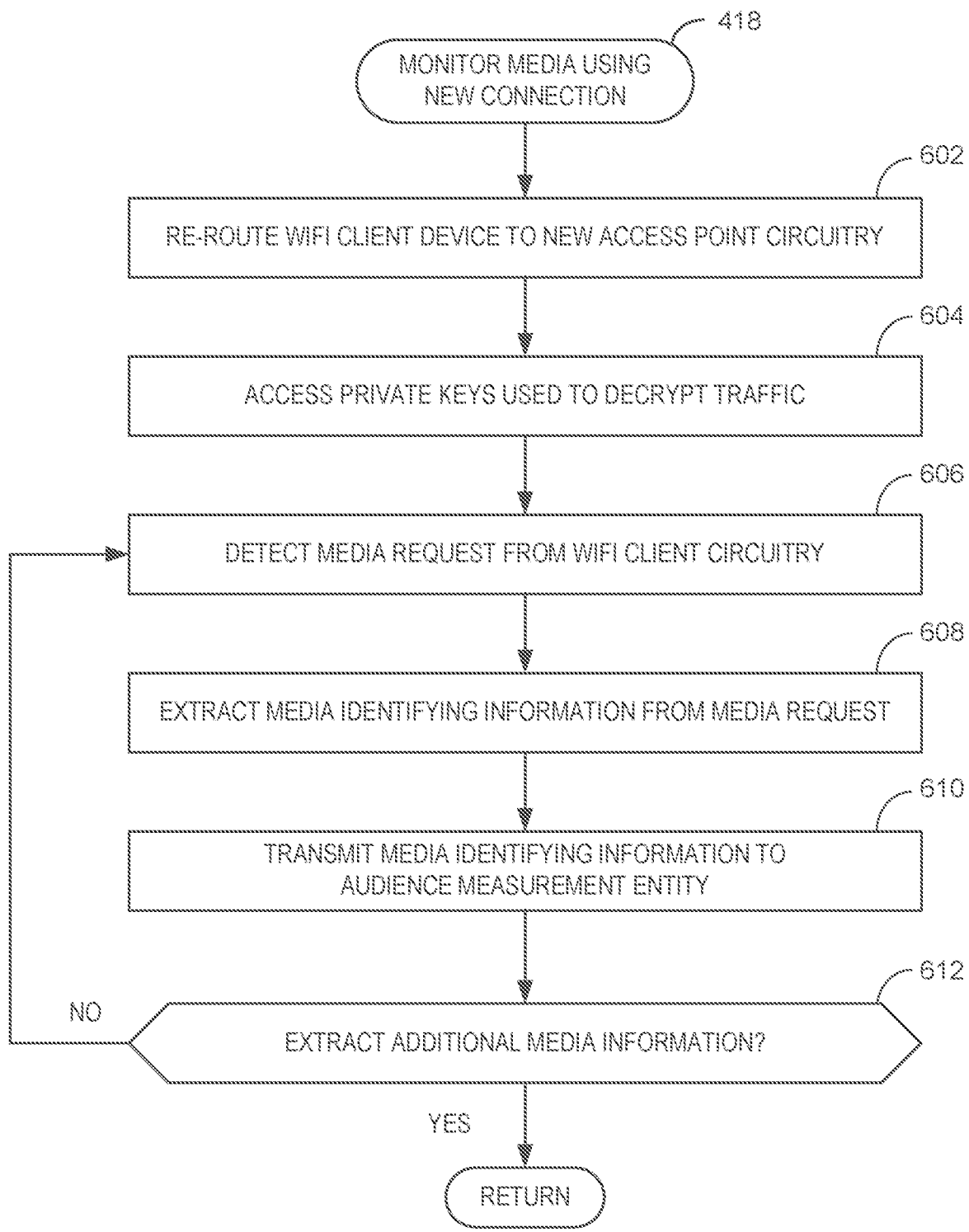
FIG. 6 is a flowchart representative of example machine readable instructions that may be executed to monitor media as described in FIG. 4.

Flowcharts representative of example hardware logic circuitry, machine readable instructions, hardware implemented state machines, and/or any combination thereof for implementing the example alternate access point circuitry 108 are shown in FIGS. 4-6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4-6, many other methods of implementing the example alternate access point circuitry 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices. %% herein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g, a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML). Structured Query Language (SQL), Swift, etc.

As mentioned above, the example operations of FIGS. 4-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., ma be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone. (2) B alone, (3) C alone, (4) A with B. (5) A with C. (6) B with C. or (7) A with B and with C. As used herein in the context of describing structures, components, items, objects and/or things, the phrase "at least one of A and B" is intended to refer to implementations including any of (1) at least one A, (2) at least one B. or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A. (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"). "one or more", and "at least one" are used interchangeably herein. Furthermore, although individually listed, a plurality of means, elements or method actions mas be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to implement the example alternate access point circuitry 108. The machine readable instructions and/or operations 400 of FIG. 4 begins when the example traffic monitor circuitry 204 monitors the traffic of the original access point circuitry 106 (Block 402). The example traffic monitor circuitry 204 may monitors traffic using the same SSID and credentials as the original access point circuitry 106.

The example traffic monitor circuitry 204 determines whether the original access point circuitry 106 has received an association request. (Block 404). The association request of block 404 is illustrated by the association request 302 and is sent by the WIFI client circuitry 102 to the original access point circuitry 106 to initiate or establish a connection. If the original access point circuitry 106 has not received an association request, the example machine readable instructions and/or operations 400 returns to block 402.

If the original access point circuitry 106 has received an association request, the example traffic monitor circuitry 204 accesses the MAC address of the WIFI client circuitry 102. (Block 406). The MAC address is included in the association request as a parameter used for communication between the WIFI client circuitry 102 and the original access point circuitry 106.

The example frame generator circuitry 206 generates a channel change beacon frame, which is send to the WIFI client circuitry 102 via the example wireless interface circuitry 202. (Block 408). The channel change beacon frame requests the WIFI client circuitry 102 change channels and establish a connection with the example alternate access point circuitry 108.

The example traffic monitor circuitry 204 determines whether the WIFI client circuitry 102 responded to a SA request within a threshold amount of time. (Block 410). The SA request was sent by the original access point circuitry 106 in response to the association request of block 404. If a SA response 308 is received, the example traffic monitor circuitry 204 determines whether the amount of time between the SA request 306 sent by the original access point circuitry 106 and the SA response 308 is less than or equal to a threshold amount of time. The threshold amount of time may be any amount In some examples, the threshold amount of time is determined by a WIFI standard. Example WIFI standards include but are not limited to such as IEEE 802.11.

If the example traffic monitor circuitry 204 determines a SA response 308 was not sent in a threshold amount of time, the wireless interface circuitry 202 determines whether the WIFI client circuitry 102 switched channels to the alternate access point circuitry 108 in response to the channel change beacon frame of block 408. (Block 412). If the WIFI client circuitry 102 did change channels, a new connection has been made between the alternate access point circuitry 108 and the WIFI client circuitry 102. The example alternate access point circuitry 108 then blocks the original connection with the original access point circuitry 106 and the WIFI client circuitry 102 as described by Usaj (Block 414).

If the example traffic monitor circuitry 204 determines the SA response 308 was sent within a threshold amount of time, the new connection has not been developed because the channel change beacon frame was ignored. Therefore, the alternate access point circuitry 108 makes the new connection to the WIFI client circuitry using a power save mode. (Block 416). Block 416 is explored further in FIG. 5.

The example alternate access point circuitry 108 monitors media using the new connection to the WIFI client circuitry 102 (Block 418). Information from the media monitoring may then be used by the example AME for ratings development or other analyses. Block 418 is explored further in FIG. 6. The example machine readable instructions and/or operations 400 end after block 418.

FIG. 5 is a flowchart representative of example machine readable instructions that may be executed to make the new connection to the WIFI client circuitry using a power save mode as described in FIG. 4. The machine readable instructions and/or operations of block 416 begin when the example traffic monitor circuitry 204 determines whether the WIFI client circuitry 102 is in power save mode. (Block 502). If the WIFI client circuitry 102 is in power save mode, the example machine readable instructions and/or operations 416 proceed to block 506.

If the WIFI client circuitry 102 is not in power save mode, the example traffic monitor circuitry 204 monitors transmissions sent by the WIFI client circuitry 102 (Block 504). In some examples, the example traffic monitor circuitry 204 makes the power save determination of block 502 by monitoring for a null frame 312 sent by the WIFI client circuitry 102. In other examples, the example traffic monitor circuitry 204 makes the power save determination by checking that a power save flag or bit is enabled within a data frame sent by the WIFI client circuitry 102. In some examples, the machine readable instructions and/or operations 416 may proceed to block 502 to check for power save mode after a set interval of time spent monitoring the WIFI client circuitry 102 transmissions. In other examples, the machine readable instructions and/or operations 416 may proceed to block 502 to check for power save mode each time a threshold number of transmissions are made by the WIFI client circuitry 102.

Once the WIFI client circuitry 102 is in power save mode, the example frame generator circuitry 206 generates an association request 314 that is sent to the original access point circuitry 106 by one or more of the example wireless interface circuitry 202 and the ethernet switch circuitry 212. (Block 506). The association request 314 includes the MAC address of the WIFI client circuitry 102 obtained in block 406.

The example traffic monitor circuitry 204 waits for an acknowledge response threshold to pass (Block 508). The acknowledge response threshold 318 represents an amount of time the original access point circuitry 106 waits for an acknowledge response from the WIFI client circuitry 102 before considering the first communications 112 broken. The original access point circuitry 106 expects an acknowledge response because, in response to receipt of an association request from the alternate access point circuitry 108 at block 506, the original access point circuitry 106 sends an acknowledge request 316 to the WIFI client circuitry 102.

The example traffic monitor circuitry 204 determines whether a connection approval frame was received from the original access point circuitry. (Block 510). If the traffic monitor circuitry 204 determines the original access point circuitry 106 did not send a connection approval frame 320, the WIFI client circuitry 102 awoke from power save mode and sent an acknowledge response to the original access point circuitry 106 before the acknowledge response threshold 318. Therefore, the machine readable instructions and/or operations 416 revert to block 502 where the alternate access point circuitry 108 begins an attempt at another connection during the next power save mode. If the traffic monitor circuitry 204 determines the original access point circuitry 106 did send a connection approval frame 320, the machine readable instructions and/or operations 416 proceed to block 512.

The traffic monitor circuitry 204 determines whether the original access point circuitry 106 sent an acknowledge frame (Block 512). The acknowledge frame 326 may be sent by the original access point circuitry 106 in response to the WIFI client circuitry 102 exiting power save mode. If the traffic monitor circuitry 204 determines the original access point circuitry 106 did send the acknowledge frame 326, the frame generator circuitry generates an acknowledge response 328 that is sent to the original access point circuitry 106 by one or more of the example wireless interface circuitry 202 and the ethernet switch circuitry 212. (Block 514). If the traffic monitor circuitry 204 determines the original access point circuitry 106 did not send the acknowledge frame 326, the machine readable instructions and/or operations 416 proceeds to block 516.

The example alternate access point circuitry 108 connects to the WIFI client circuitry 102. (Block 516). In some examples, the connection of block 516 is established when the WIFI client circuitry 102 sends an association request to the example alternate access point circuitry 108 so that it can reconnect to an access point and access media from the external network 110. In other examples, the frame generator circuitry 206 generates another channel change beacon frame, which is sent to the WIFI client circuitry 102 via the wireless interface circuitry 202 or ethernet switch circuitry 212, to establish the connection of block 516. The example machine readable instructions and/or operations 416 return to block 418 after block 516.

FIG. 6 is a flowchart representative of example machine readable instructions that may be executed to monitor media as described in FIG. 4. In some examples, the example alternate access point circuitry 108 may not be implemented with example media monitor circuitry 210. In such examples, the example machine readable instructions and/or operations of block 418 may begin when the example alternate access point circuitry 108 reroutes the WIFI client circuitry 102 to establish a connection with new access point circuitry. (Block 602). The new access point circuitry may be implemented with example media monitor circuitry 210 in addition to the other components found in the example alternate access point circuitry 108. In other examples, the example machine readable instructions and/or operations of block 418 skips block 602.

In some examples, the example traffic monitor circuitry 204 may access private keys used to decrypt network traffic. (Block 604). In such examples, network traffic including requests from the WIFI client circuitry 102 for streaming media data may be encrypted and therefore illegible without one or more private keys In other examples, requests for streaming media data may not be encrypted, and the example machine readable instructions and/or operations 418 may skip block 604.

The example traffic monitor circuitry 204 detects a media request from the WIFI client circuitry 102 (Block 606). In some examples, the example traffic monitor circuitry 204 looks for certain flags or frame headers to indicate that a given frame of data includes a request for streaming media.

The example media monitor circuitry 210 (extracts media identifying information from the media request of block 606. (Block 608). Examples of media identifying information include but are not limited to a title, streaming provider, genre, run time, watch time, etc.

The example router circuitry 208 routes the media identifying information to the example AME. (Block 610). The router circuitry 208 sends data to the example AME via the ethernet switch circuitry 212 and/or the wireless interface circuitry 202, which in turn connect to the external network 110.

The example media monitor circuitry 210 determines whether to extract additional media information. (Block 612). In some examples, the example media monitor circuitry 210 makes the determination of block 612 by determining from a first received media request that a second future media request is scheduled. Such examples may occur when a single piece of content requires multiple data requests. Additionally or alternatively, the media monitor circuitry 210 may make the determination of block 612 based on instructions provided by the example AME over the external network 110.

If the example media monitor circuitry 210 decides to extract additional information, the example machine readable instructions and/or operations 418 return to block 606 to detect additional media requests. If the example media monitor circuitry 210 decides not to extract additional information, the example machine readable instructions and/or operations 418 end.

Figure 7:
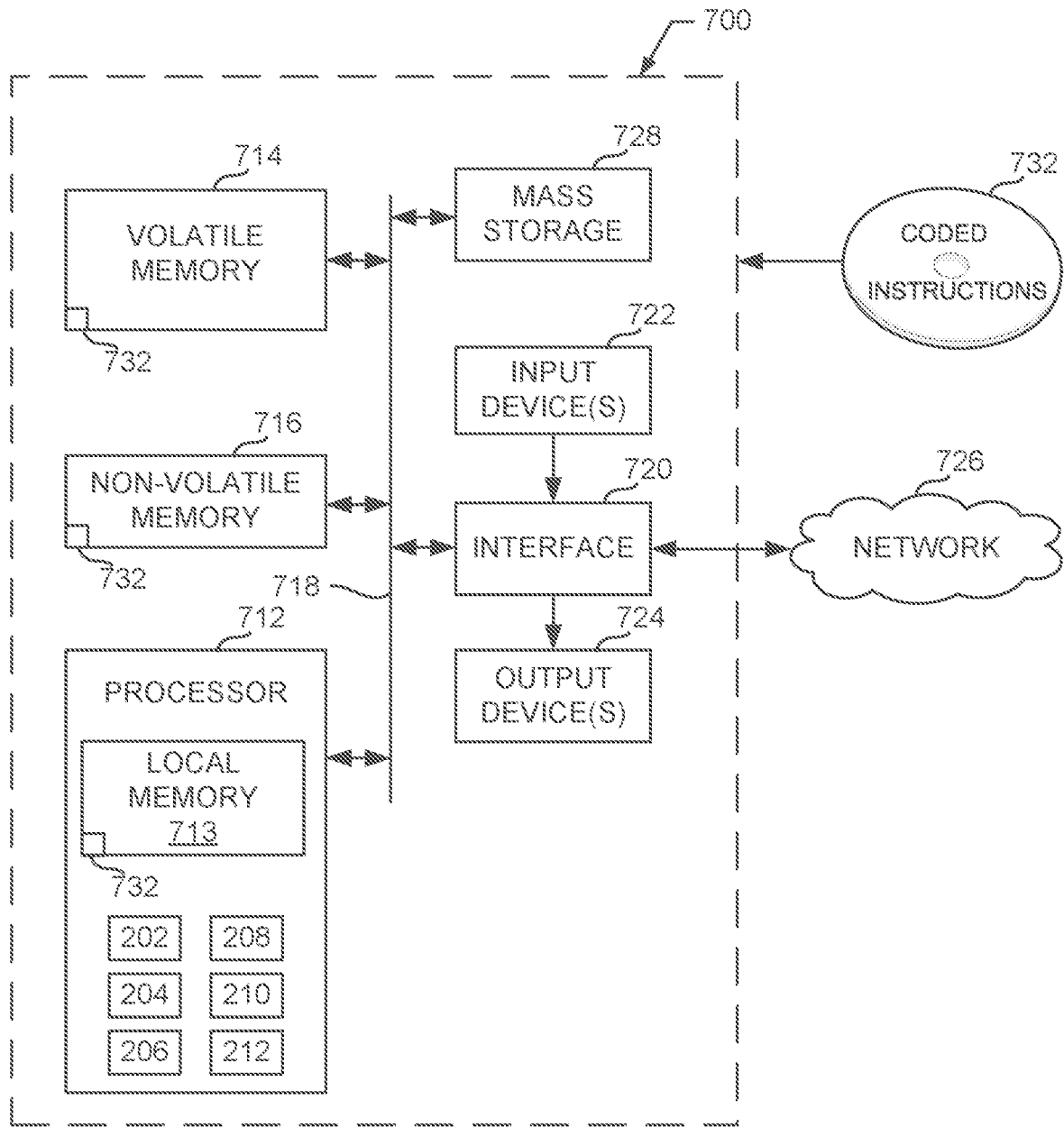
FIG. 7 is a block diagram of an example processing platform including processor circuitry structured to execute the example machine readable instructions of FIG. 4 to implement the alternate access point circuitry.

FIG. 7 is a block diagram of an example processor platform 700 structured to execute and/or instantiate the machine readable instructions and/or operations of FIGS. 4, 5, and 6 to implement the example alternate access point circuitry 108 of FIG. 1. The processor platform 700 can be, for example, a server, a personal computer, a workstation, a self-learning machine (e.g., a neural network), an Internet appliance, a set top box, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits. FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example w % ireless interface circuitry 202, example traffic monitor circuitry 204, example frame generator circuitry. 206, example router circuitry 208, example media monitor circuitry 210, and example ethernet switch circuitry 212.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM). RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of an kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIGS. 4, 5, and 6, may be stored in the mass storage device 728, in the volatile memory 714, in the non-volatile memory 716, and/or on a removable non-transitory computer readable storage medium such as a CD or DVD.

Figure 8:
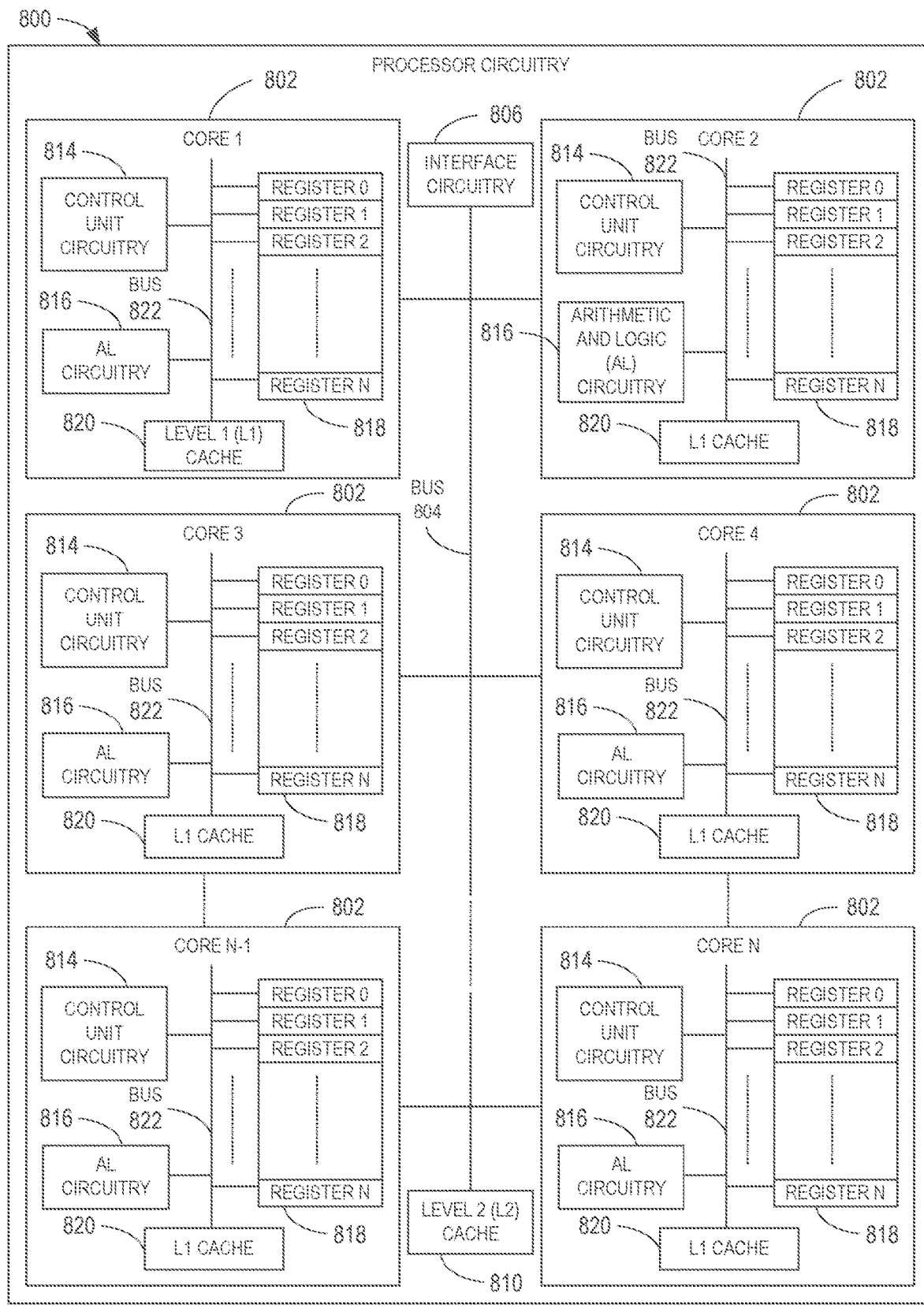
FIG. 8 is a block diagram of an example implementation of the processor circuitry of FIG. 4.

FIG. 8 is a block diagram of an example implementation of the processor circuitry 712 of FIG. 7. In this example, the processor circuitry 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 4, 5, and 6.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 420 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU. DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g, coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 822 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
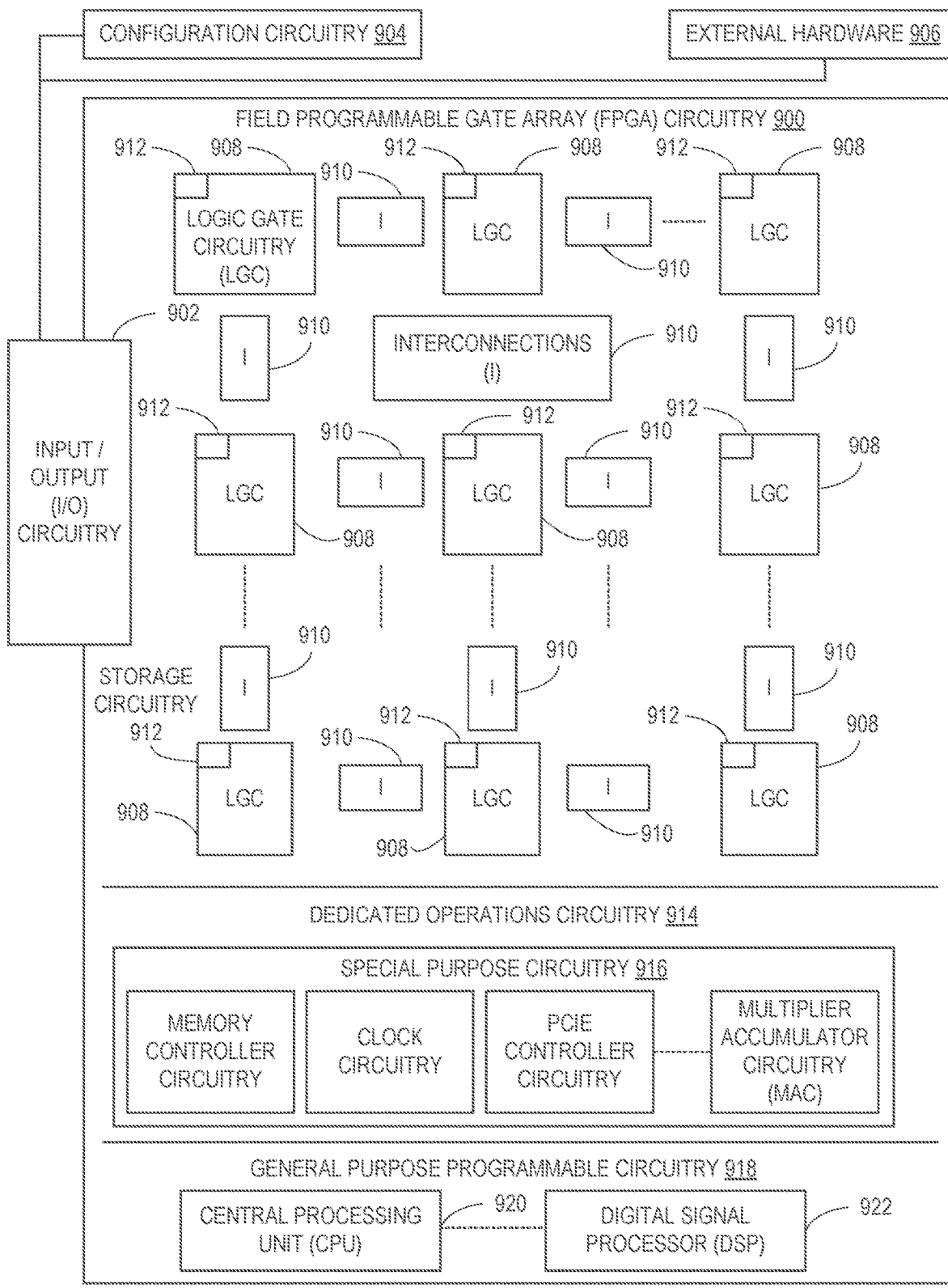
FIG. 9 is a block diagram of another example implementation of the processor circuitry of FIG. 4.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 4, 5, and 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 4, 5, and 6. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 4, 5, and 6. As such, the FPGA circuitry 900 may be structured to effectively instantiate some or all of the machine readable instructions of the flowcharts of FIGS. 4, 5, and 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 4, 5, and 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 4, 5, and 6 and/or other desired operations. The logic gate circuitry 908 shown in FIG. 9 is fabricated in groups or blocks. Each block includes semiconductor-based electrical structures that may be configured into logic circuits In some examples, the electrical structures include logic gates (e.g, And gates. Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry. PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modem FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 4, 5, and 6 may be executed by one or more of the cores 802 of FIG. 8 and a second portion of the machine readable instructions represented by the flowcharts of FIGS. 4, 5, and 6 may be executed by the FPGA circuitry 900 of FIG. 9.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPL in yet another package, and an FPGA in still yet another package.

Figure 10:
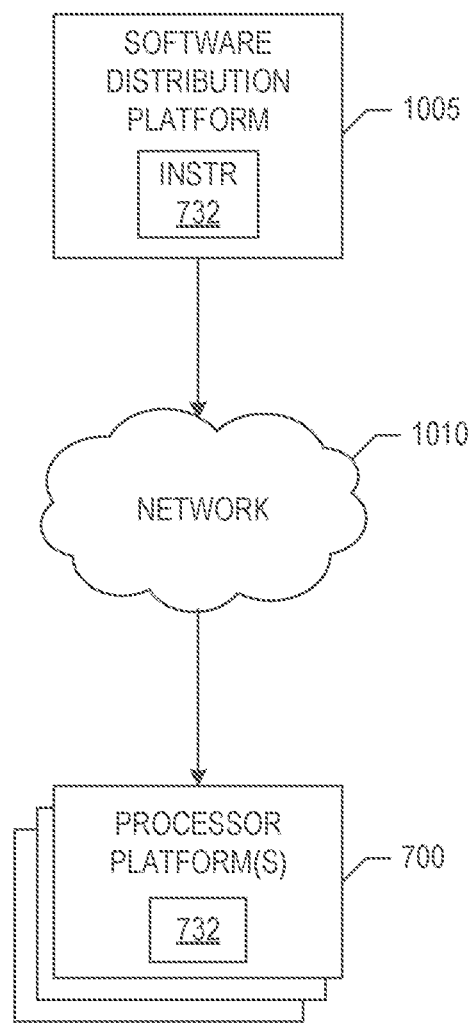
FIG. 10 is a block diagram of an example software distribution platform (e.g., one or more servers) to distribute software (e.g., software corresponding to the example machine readable instructions of FIGS. 4, 5, and 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers. OEMs, etc., who purchase and/ or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions of FIGS. 4, 5, and 6, as described above. The one or more servers of the example software distribution platform 1005 are in communication with a network 1010, which may correspond to any one or more of the Internet and/or any of the example networks 110 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 732 of FIG. 7, may be downloaded to the example processor platform 700, which is to execute the machine readable instructions 732 to implement the example alternate access point circuitry 108. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that de-authenticate and reroute client sessions for media monitoring. The disclosed systems, methods, apparatus, and articles of manufacture improve the efficiency of using a computing device by blocking an original connection between a client and an access point while the client is in a power save mode. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to de-authenticate and reroute client sessions for media monitoring are disclosed herein. Further examples and combinations thereof include the following.

Example 1 includes an apparatus to reroute a client session comprising memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations or the third operations to instantiate traffic monitor circuitry to determine whether client circuitry has entered a power save mode, and frame generator circuitry to, in response to a determination that the client circuitry has entered the power save mode, generate an association request for an access point, wireless interface circuitry to receive a connection approval frame, and the frame generator circuitry further to, in response to a determination that the access point has sent an acknowledge frame, generate an acknowledge response for the access point.

Example 2 includes the apparatus of example 1, wherein the wireless interface circuitry is to receive the connection approval frame after a threshold amount of time, wherein the client circuitry does not respond to an acknowledge request from the access point within the threshold amount of time.

Example 3 includes the apparatus of example 1, wherein the association request is a second association request, wherein the traffic monitor circuitry is to further identify a first association request sent by the client circuitry to the access point, the first association request including a Media Access Control (MAC) address, the first association request sent before the second association request, the second association request including the MAC address.

Example 4 includes the apparatus of example 3, wherein the frame generator circuitry is to generate a channel change beacon frame in response to the identification of the first association request.

Example 5 includes the apparatus of example 4, wherein the traffic monitor circuitry is to determine the client circuitry is in a power save mode in response to a determination that the channel change beacon frame was ignored.

Example 6 includes the apparatus of example 1, further including router circuitry to direct the association request and the acknowledge response to the access point using a wired or wireless connection.

Example 7 includes the apparatus of example 1, wherein the wireless interface circuitry is to further receive media data requests sent by the client circuitry, wherein the client circuitry sends the media data requests in response to a determination that the access point received the acknowledge response.

Example 8 includes the apparatus of example 7, further including media monitor circuitry to extract media identifying information from the media data requests, and further including router circuitry to route the media identifying information to an audience measurement entity.

Example 9 includes the apparatus of example 7, wherein the traffic monitor circuitry is to further identify a private key used to decrypt network traffic, the network traffic including the media data requests.

Example 10 includes a non-transitory machine readable medium comprising instructions that, when executed, cause at least one processor to at least determine whether client circuitry has entered a power save mode, in response to a determination that the client circuitry has entered the power save mode, generate an association request for an access point, receive a connection approval frame, and in response to a determination that the access point has sent an acknowledge frame, generate an acknowledge response for the access point.

Example 11 includes the non-transitory machine readable medium of example 10, wherein the instructions, when executed, cause the at least one processor to receive a connection approval frame after a threshold amount of time, wherein the client circuitry does not respond to an acknowledge request from the access point within the threshold amount of time.

Example 12 includes the non-transitory machine readable medium of example 10, wherein the association request is a second association request, wherein the instructions, when executed, are to cause at least one processor to at least identify a first association request sent by the client circuitry to the access point, the first association request including a Media Access Control (MAC) address, the first association request sent before the second association request, the second association request including the MAC address.

Example 13 includes the non-transitory machine readable medium of example 12, wherein the instructions, when executed, cause the at least one processor to generate a channel change beacon frame in response to the identification of the first association request.

Example 14 includes the non-transitory machine readable medium of example 13, wherein the instructions, when executed, cause the at least one processor to determine the client circuitry is in a power save mode in response to a determination that the channel change beacon frame was ignored.

Example 15 includes the non-transitory machine readable medium of example 10, wherein the instructions, when executed, cause the at least one processor to direct the association request and the acknowledge response to the access point using a wired or wireless connection.

Example 16 includes the non-transitory machine readable medium of example 10, wherein the instructions, when executed, cause the at least one processor to receive media data requests sent by the client circuitry, wherein the client circuitry sends the media data requests in response to a determination that the access point received the acknowledge response.

Example 17 includes the non-transitory machine readable medium of example 16, wherein the instructions, when executed, cause the at least one processor to extract media identifying information from the media data requests, and route the media identifying information to an audience measurement entity.

Example 18 includes the non-transitory machine readable medium of example 16, wherein the instructions, when executed, cause the at least one processor to identify a private key used to decrypt network traffic, the network traffic including the media data requests.

Example 19 includes a method to reroute a client session comprising determining whether client circuitry has entered a power save mode, in response to a determination that the client circuitry has entered the power save mode, generating an association request for an access point, receiving a connection approval frame, and in response to a determination that the access point has sent an acknowledge frame, generating an acknowledge response for the access point.

Example 20 includes the method of example 19, further including receiving the connection approval frame after a threshold amount of time, wherein the client circuitry does not respond to an acknowledge request from the access point within the threshold amount of time.

Example 21 includes the method of example 19, wherein the association request is a second association request, further including identifying a first association request sent by the client circuitry to the access point, the first association request including a Media Access Control (MAC) address, the first association request sent before the second association request, the second association request including the MAC address.

Example 22 includes the method of example 21, further including generating a channel change beacon frame in response to the identification of the first association request.

Example 23 includes the method of example 22, further including determining the client circuitry is in a power save mode in response to a determination that the channel change beacon frame was ignored.

Example 24 includes the method of example 19, further including directing the association request and the acknowledge response to the access point using one or more of a wireless or wired connection.

Example 25 includes the method of example 19, further including receiving media data requests sent by the client circuitry, wherein the client circuitry sends the media data requests in response to a determination that the access point received the acknowledge response.

Example 26 includes the method of example 25, further including extracting media identifying information from the media data requests, and routing the media identifying information to an audience measurement entity.

Example 27 includes the method of example 25, further including identifying a private key used to decrypt network traffic, the network traffic including the media data requests.

Example 28 includes an apparatus to reroute a client session, the apparatus comprising means for determining whether client circuitry has entered a power save mode, in response to a determination that the client circuitry has entered the power save mode, means for generating an association request for an access point, means for receiving a connection approval frame, and in response to a determination that the access point has sent an acknowledge frame, means for generating an acknowledge response for the access point.

Example 29 includes the apparatus of example 28, further including means for receiving the connection approval frame after a threshold amount of time, wherein the client circuitry does not respond to an acknowledge request from the access point within the threshold amount of time.

Example 30 includes the apparatus of example 28, wherein the association request is a second association request, further including means for identifying a first association request sent by the client circuitry to the access point, the first association request including a Media Access Control (MAC) address, the first association request sent before the second association request, the second association request including the MAC address.

Example 31 includes the apparatus of example 30, further including means for generating a channel change beacon frame in response to the identification of the first association request.

Example 32 includes the apparatus of example 31, further including means for determining the client circuitry is in a power save mode in response to a determination that the channel change beacon frame was ignored.

Example 33 includes the apparatus of example 28, further including means for directing the association request and the acknowledge response to the access point using one or more of a wireless or wired connection.

Example 34 includes the apparatus of example 28, further including means for receiving media data requests sent by the client circuitry, wherein the client circuitry sends the media data requests in response to a determination that the access point received the acknowledge response.

Example 35 includes the apparatus of example 34, further including means for extracting media identifying information from the media data requests, and means for routing the media identifying information to an audience measurement entity.

Example 36 includes the apparatus of example 34, further including means for identifying a private key used to decrypt network traffic, the network traffic including the media data requests.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to reroute a client session comprising:
   memory; and
   processor circuitry including one or more of:
      at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus;
      a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or
      Application Specific Integrate Circuitry (ASIC) including logic gate circuitry to perform one or more third operations;
   the processor circuitry to perform at least one of the first operations, the second operations or the third operations to instantiate:
      traffic monitor circuitry to determine whether client circuitry has entered a power save mode; and
      frame generator circuitry to, in response to a determination that the client circuitry has entered the power save mode, generate an association request for an access point;
      wireless interface circuitry to receive a connection approval frame; and
      the frame generator circuitry further to, in response to a determination that the access point has sent an acknowledge frame, generate an acknowledge response for the access point.

2. The apparatus of claim 1, wherein the wireless interface circuitry is to receive the connection approval frame after a threshold amount of time, wherein the client circuitry does not respond to an acknowledge request from the access point within the threshold amount of time.

3. The apparatus of claim 1, wherein the association request is a second association request, wherein the traffic monitor circuitry is to further identify a first association request sent by the client circuitry to the access point, the first association request including a Media Access Control (MAC) address, the first association request sent before the second association request, the second association request including the MAC address.

4. The apparatus of claim 3, wherein the frame generator circuitry is to generate a channel change beacon frame in response to the identification of the first association request.

5. The apparatus of claim 4, wherein the traffic monitor circuitry is to determine the client circuitry is in a power save mode in response to a determination that the channel change beacon frame was ignored.

6. The apparatus of claim 1, further including router circuitry to direct the association request and the acknowledge response to the access point using a wired or wireless connection.

7. The apparatus of claim 1, wherein the wireless interface circuitry is to further receive media data requests sent by the client circuitry, wherein the client circuitry sends the media data requests in response to a determination that the access point received the acknowledge response.

8. The apparatus of claim 7, further including media monitor circuitry to extract media identifying information from the media data requests, and further including router circuitry to route the media identifying information to an audience measurement entity.

9. The apparatus of claim 7, wherein the traffic monitor circuitry is to further identify a private key used to decrypt network traffic, the network traffic including the media data requests.

10. A non-transitory machine readable medium comprising instructions that, when executed, cause at least one processor to at least:

determine whether client circuitry has entered a power save mode;

in response to a determination that the client circuitry has entered the power save mode, generate an association request for an access point;

receive a connection approval frame; and in response to a determination that the access point has sent an acknowledge frame, generate an acknowledge response for the access point.

11. The non-transitory machine readable medium of claim 10, wherein the instructions, when executed, cause the at least one processor to receive a connection approval frame after a threshold amount of time, wherein the client circuitry does not respond to an acknowledge request from the access point within the threshold amount of time.

12. The non-transitory machine readable medium of claim 10, wherein the association request is a second association request, wherein the instructions, when executed, are to cause at least one processor to at least identify a first association request sent by the client circuitry to the access point, the first association request including a Media Access Control (MAC) address, the first association request sent before the second association request, the second association request including the MAC address.

13. The non-transitory machine readable medium of claim 12, wherein the instructions, when executed, cause the at least one processor to generate a channel change beacon frame in response to the identification of the first association request.

14. The non-transitory machine readable medium of claim 13, wherein the instructions, when executed, cause the at least one processor to determine the client circuitry is in a power save mode in response to a determination that the channel change beacon frame was ignored.

15. The non-transitory machine readable medium of claim 10, wherein the instructions, when executed, cause the at least one processor to direct the association request and the acknowledge response to the access point using a wired or wireless connection.

16. The non-transitory machine readable medium of claim 10, wherein the instructions, when executed, cause the at least one processor to receive media data requests sent by the client circuitry, wherein the client circuitry sends the media data requests in response to a determination that the access point received the acknowledge response.

17. The non-transitory machine readable medium of claim 16, wherein the instructions, when executed, cause the at least one processor to:

extract media identifying information from the media data requests; and route the media identifying information to an audience measurement entity.

18. The non-transitory machine readable medium of claim 16, wherein the instructions, when executed, cause the at least one processor to identify a private key used to decrypt network traffic, the network traffic including the media data requests.

19. A method to reroute a client session comprising:

determining whether client circuitry has entered a power save mode;

in response to a determination that the client circuitry has entered the power save mode, generating an association request for an access point;

receiving a connection approval frame; and in response to a determination that the access point has sent an acknowledge frame, generating an acknowledge response for the access point.

20. The method of claim 19, further including receiving the connection approval frame after a threshold amount of time, wherein the client circuitry does not respond to an acknowledge request from the access point within the threshold amount of time.

* * * * *